United States Patent
Croset et al.

[11] 3,785,717
[45] Jan. 15, 1974

[54] STEPPED INTEGRATED WAVEGUIDE STRUCTURE WITH DIRECTIONAL COUPLING AND A METHOD OF MANUFACTURING SUCH STRUCTURES

[75] Inventors: Michel Croset; Gonzalo Velasco, both of Paris, France

[73] Assignee: Thomson-CSF, Paris, France

[22] Filed: Aug. 10, 1972

[21] Appl. No.: 279,726

[30] Foreign Application Priority Data
Sept. 16, 1971  France .................................. 7133391

[52] U.S. Cl. ............ 350/96 WG, 333/10, 333/95 R
[51] Int. Cl. ........ H01p 5/14, H01p 3/16, G02b 5/14
[58] Field of Search .................... 350/96 R, 96 WG, 350/96 B; 333/95 R, 10

[56] References Cited
UNITED STATES PATENTS
| | | | |
|---|---|---|---|
| 3,320,114 | 5/1967 | Schulz........................... | 350/96 B X |
| 3,456,209 | 7/1969 | Diemer......................... | 350/96 WG |
| 3,647,406 | 3/1972 | Fisher........................ | 350/96 WG X |

OTHER PUBLICATIONS
Miller, "Integrated Optics: An Introduction" in The Bell System Technical Journal, Vol. 48, Sept. 1969, No. 7; pp. 2059–2069

French et al., "Refractive Index Changes Produced in Glass by Ion Exchange" in Ceramic Bulletin, Vol. 49, No. 11, Nov. 1970; pp. 974–977

Primary Examiner—Rudolph V. Rolinec
Assistant Examiner—Marvin Nussbaum
Attorney—John W. Malley et al.

[57] ABSTRACT

A multilayer structure of integrated optical waveguides is provided.

Each waveguide is produced by the diffusion of a doping agent into the layer into which it is integrated. This doping agent, in the zone in which it is implanted, causes a variation in the refractive index. The result is that the waveguide is formed by a region of higher refractive index than that of the layer in which it is implanted.

Thus, superimposed waveguide structures are obtained which can be used to form directional couplers.

9 Claims, 9 Drawing Figures

STEPPED INTEGRATED WAVEGUIDE STRUCTURE WITH DIRECTIONAL COUPLING AND A METHOD OF MANUFACTURING SUCH STRUCTURES

The present invention applies in the field of optics, an extension of certain techniques used to the production of electronic integrated circuits. It makes it possible to produce waveguide circuits which can be used for electromagnetic waves ranging between the ultraviolet and the sub-millimetric, and to provide coupling of these circuits with one another through high-efficiency directional couplers.

Waveguides of this kind can be constructed by constant-section fibres produced, in a substance which is transparent vis-a-vis the transmitted radiation, said substance having a refractive index higher than that of the external medium; under these conditions, the radiation propagating through the fibre is reflected, when it strikes the walls thereof at an angle of incidence differing from 90°, as a consequence of the phenomenon of total reflection. It can be shown that propagation of the radiation through the fibre is the better the closer one at least of the dimensions of the transverse section thereof, is to that of the wavelength of the radiation to be transmitted.

Techniques of deposition under vacuo and masking, used for the manufacture of integrated electronic circuits, can be used in order to deposit upon a suitable flat substrate, a transparent material in the form of constant-width channels having a thickness which is uniform and close to the optical wavelength, thus creating a network of waveguides having the desired patterns. This kind of network can be left exposed to the air or can be encapsulated, by deposition under vacuo in another material of lower refractive index.

A difficulty arises when it is desired, using a technique currently employed in microwaves, to couple several of these circuits by means of directional couplers. Then, there are two rectilinear waveguide elements parallel with one another at a sufficiently short interval for the evanescent wave associated with the wave transmitted to one of the waveguides and propagating in the external medium, to penetrate the other waveguide; thus, progressively, a fraction of the energy propagating in the first waveguide, is transferred to the second waveguide. However, because of the exponential decrease, perpendicularly to the waveguide axis, in the intensity of the evanescent wave, in order to achieve effective coupling at reasonable wavelengths, it is necessary to reduce the interval between the waveguides to a fraction of the wavelength. Thus, considering the case of lightwaves, it is necessary to arrange two parallel waveguides which are spaced apart by only a few tenths of a micron and this is something which cannot be done utilising conventional masking techniques.

To overcome .his technical deficiency, the two rectilinear sections constituting the coupler can be arranged not in one and the same plane parallel to the substrate, but instead superimposed upon one another in a direction perpendicular to the substrate, this by separating them from one another with the help of an intermediate layer of a transparent material having a lower refractive index, which layer, without any difficulty at all, can be produced in a constant small thickness compared with the thickness of the waveguides by vaporization under vacuo. To do so, the waveguide following the first circuit is deposited upon the substrate, then the intermediate layer on top of this, the latter following the relief created by the first waveguide, and, finally, the second waveguide which is to be coupled with the first. The drawback of this kind of technique is that the intermediate layer, following the relief created by the underlying circuit, imposes this relief form on the waveguide associated with the second circuit, in planes perpendicular to the substrate, giving it substantial curvatures which cause high losses as far as proper propagation of the radiation is concerned.

It is an object of the invention to provide a method which is simple to put into effect, for producing a stepped structure in which each network of waveguides is arranged in a plane parallel to the substrate, this network being separated from the waveguide network underlying it by a transparent, flat dielectric layer parallel to the substrate and formed of the same substance as that which encapsulates the waveguides, whose thickness can readily be made as small as required. The coupling between two waveguides can then be achieved under excellent conditions without the propagation in each waveguide being disturbed by accidental irregularities in the surface of which it is deposited. This stepped structure, furthermore, makes it possible to produce circuits which are much more sophisticated than the conventional structures, in which the different waveguides are deposited in one and the same plane.

The invention and the advantages which it procures, will be better understood from a consideration of the ensuing description and the attached drawings in which:

FIGS. 1 and 2 illustrate views of conventional directional couplers for dielectric waveguides deposited upon a thin film, in which a section has been taken perpendicularly to the direction of the coupler.

Figure 1:
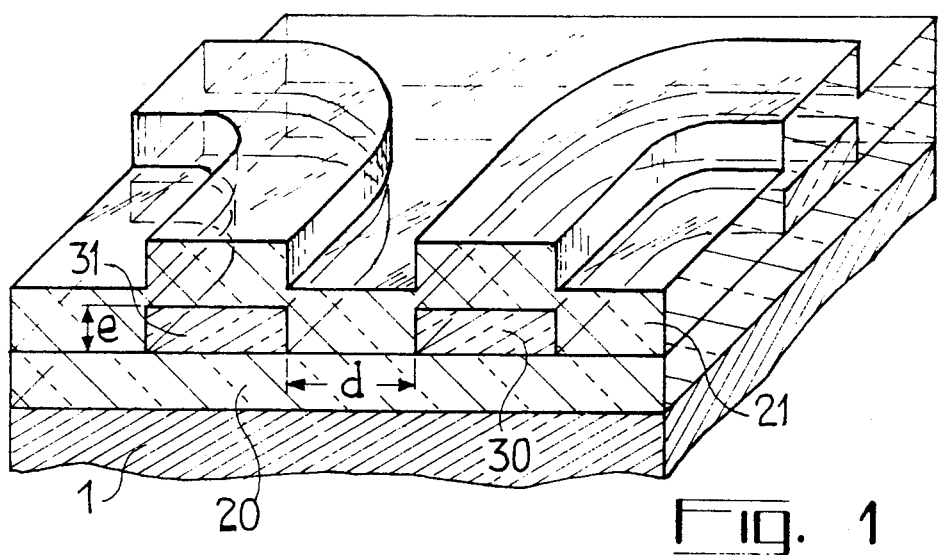
FIGS. 1 and 2 illustrate conventional directional couplers.

FIG. 1 relates to a structure in which the two waveguides are arranged side by side in one plane.

On the flat substrate 1, there have been successively deposited:

a flat layer 20 having a low refractive index, the two rectangular section waveguides 30 and 31 made of a substance having a high refractive index and disposed side by side parallel to one another with their rectilinear sections, and an encapsulating layer 21 of low refractive index, which latter layer follows the relief form determined by the underlying waveguides.

The thickness of the two waveguides is of the same order of magnitude as the wavelength of the radiation to be transmitted. This method has a drawback, the distance $d$, which is to be as small as possible, has a minimum relatively large, due to the masking techniques used in this process.

Figure 2:
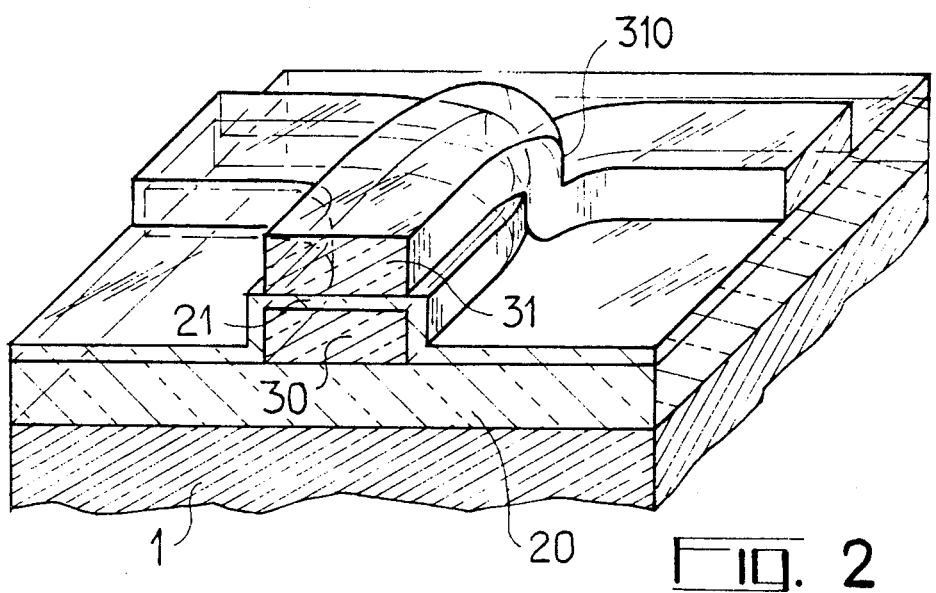

FIG. 2 relates to another arrangement of waveguides forming the coupler, where the two waveguides are superimposed in accordance with the direction perpendicular to the substrate. The structure is formed by a flat substrate 1, by a first layer 20 having a low refractive index, by a first rectangular-section waveguide 30 formed in a substance having a high refractive index, by an encapsulating layer 21 having a low refractive index of small thickness, which follows the relief formation determined by the underlying waveguide, and by a second waveguide 31 also having a high refractive index. The two waveguides are arranged parallel to one another with their rectilinear portion forming the directional coupler. The layer 21, which is very thin, allows a good coupling ; by contrast, the top waveguide 31 necessarily, at 310 exhibits an abrupt bend with a small radius of curvature which is imposed by the relief form of the layer 21 and is extremely undesirable as far as efficient propagation of the electromagnetic wave is concerned.

Figure 3:
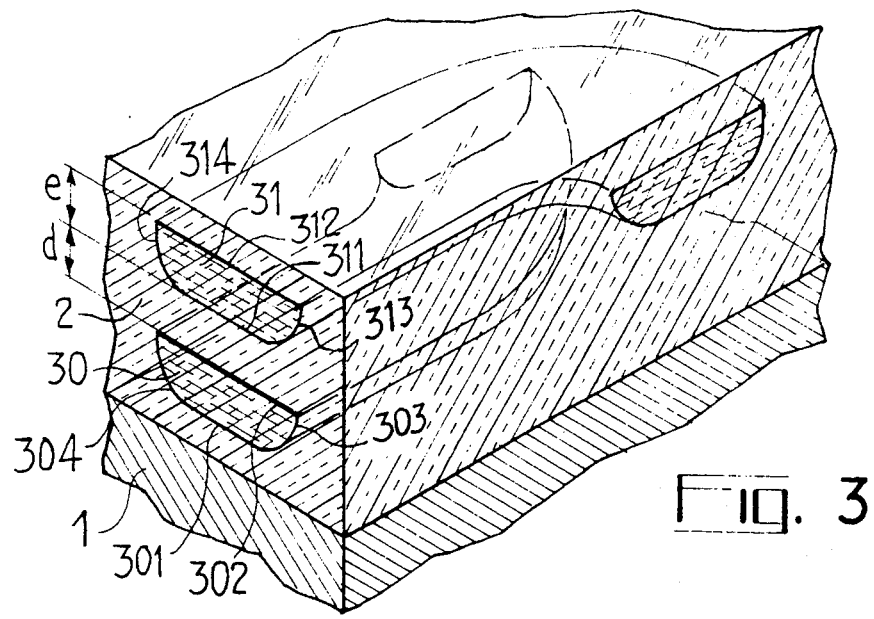
FIGS. 3 and 4 illustrate stepped waveguide structures integrated with directional couplers in accordance with the invention.
Figure 4:
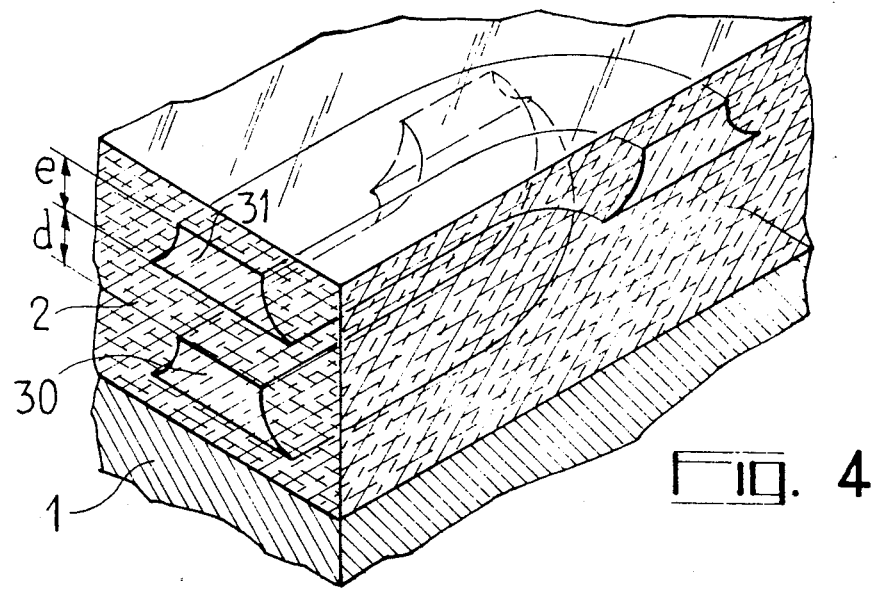

FIGS. 3 and 4 illustrate stepped thin-film waveguide structures with directional coupling, produced according to the invention, where, to facilitate understanding, a number of steps has been reduced to two. In these figures, too, a section has been shown perpendicularly to the direction of the coupler.

In both Figures, a flat substrate 1 can be seen upon which there has been deposited a film 2 of a transparent substance having a low refractive index, within which there have been inserted two waveguides 30 and 31 made of a transparent substance having a high refractive index. These waveguides each have two flat faces, respectively 301 and 302, 311 and 312, each of these faces, both in the coupling zone and outside it, being located in one and the same plane parallel to the substrate. For reasons associated with the method of manufacture of the structure and which will be explained hereinafter, the two other faces of each waveguide, respectively 303 and 304, 313 and 314, are curved, their right sections taking substantially the form of a circular arc of constant radius, the concavity of which is disposed towards the interior of the waveguide (FIG. 3) or towards the outside (FIG. 4). This non-planar form of the lateral faces does not affect the propagation of the radiation through the waveguide, since from one end to the other of the latter the radius of curvature of said faces is constant. In the coupling zone, the distance d between the faces 302 and 311 is small compared with the thickness e of the waveguide, making it possible to obtain couplers of high efficiency.

The principle of the method in accordance with the invention, which is used to produce a stepped structure of the kind described in FIGS. 3 and 4, consists in depositing on a flat substrate a uniform layer of a first, base material, which is transparent vis-a-vis the radiation to be transmitted by the waveguide and in locally varying the refractive index of said layer by diffusing into same, at desired points and using an appropriate mask, a second, doping material which modifies its refractive index without altering the transparency.

As a matter of fact, it is well-known that in a general manner any variation in the composition of a material affects the value of its refractive index. Although this variation in refractive index is often small, this constitutes no obstacle to the production of a waveguide ; as a matter of fact, it is desirable that a difference between the higher refractive index constituting the waveguide and the lower refractive index constituting the external environment, shall be small, both to promote the propagation in a single propagation mode and to improve the efficiency of directional couplers.

The process used to insert the waveguide in the layer differs slightly depending upon whether the diffusion of material increases or reduces the refractive index of the base material.

Figure 5:
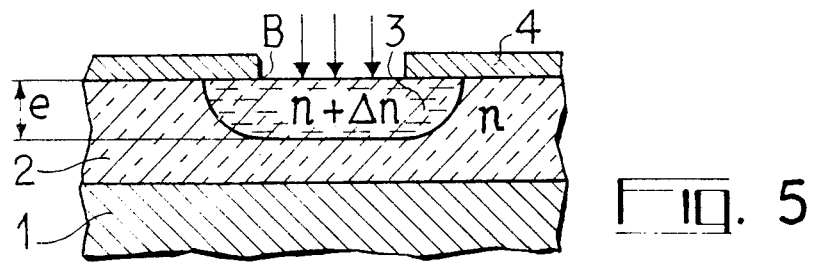
FIGS. 5 and 6 are explanatory diagrams illustrating the method of manufacture according with the invention.

FIG. 5 relates to the case where the refractive index is increased and illustrates a sectional view of the layer 2 deposited upon its substrate 1. A mask 4 protects against diffusion the regions outside the contour of the waveguide. The doping material enters the unprotected regions, whose refractive index it increases, so that the waveguide 3 is formed. The time for which diffusion takes place, being a function of the temperature to which the layer is raised, makes it possible to regulate the depth e of penetration of the material and therefore the waveguide thickness, which latter should be smaller than the thickness of the layer. Moreover, the material diffuses sidely beneath the mask, this having as a consequence the curvature of the diffusion zone, as well known.

Figure 6:
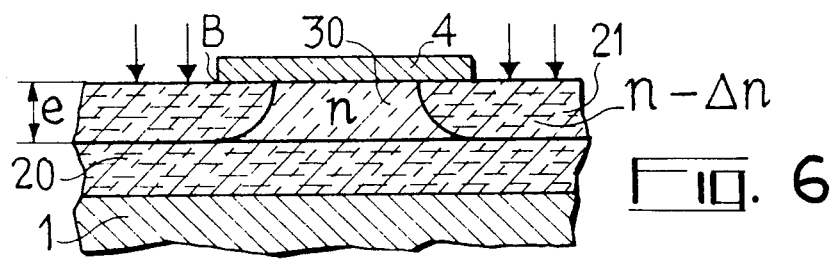

FIG. 6 relates to the case where the diffusion of the material reduces the refractive index of the base material. A first layer 20 of basic material is then deposited upon the substrate 1, which layer undergoes uniform reduction in refractive index as a consequence of a first diffusion operation ; it is also possible to simultaneously deposit the base material and the doping material, in suitable proportions, thus avoiding the need for this diffusion operation. Then, a second layer 21 is deposited, followed by a mask 4 having the contours of the waveguide network to be obtained ; a second diffusion operation then makes it possible to reduce the refractive index in the regions outside the waveguides. The region 30, protected by the mask, remains at the higher refractive index and forms the waveguide or waveguides.

In either case, the top face subsequently has the mask removed from it, together with any residues of doping material ; then, the same succession of operations is repeated as many times as there are stages to be produced in the structure, and a final layer of low refractive index is deposited to cover the overall arrangement. The directional couplers are obtained by forming in each waveguide, at the desirned locations, rectilinear sections of suitable length and by ensuring, at a time of deposition of the successive masks, that these rectilinear portions are exactly superimposed upon one another. In this manner, the stepped structures described earlier in relation to FIGS. 3 and 4, are obtained, these relating respectively to the cases in which the diffused material increases or diminishes the refractive index of the base material.

The non-planar form of the lateral faces of the waveguides results from the isotropy of the diffusion mechanism. It will be seen, in other words, from a consideration both of FIG. 5 and FIG. 6, that the material diffusing from a point B at the edge of the mass, propagates at the same rate in directions parallel or perpendicular to the substrate, with the result that the zone containing the diffused material is partly delimited by a circular arc centered at B.

The method by which the diffusion operation is carried out, differs depending upon the nature of the doping material. If the latter remains solid at the diffusion temperature, it could be deposited under vacuo, prior to heating. If the material is a vapour or gas, the layer of base material will be heated, together with its mask, if said gas or vapour has a suitable pressure.

A first improvement, according to the invention, to the afore described method, which can be utilised if the doping material is solid at the ambient temperature and is of the kind which raises the diffraction index of the base material, consists in carrying out all the diffusion operations simultaneously.

Figure 7:
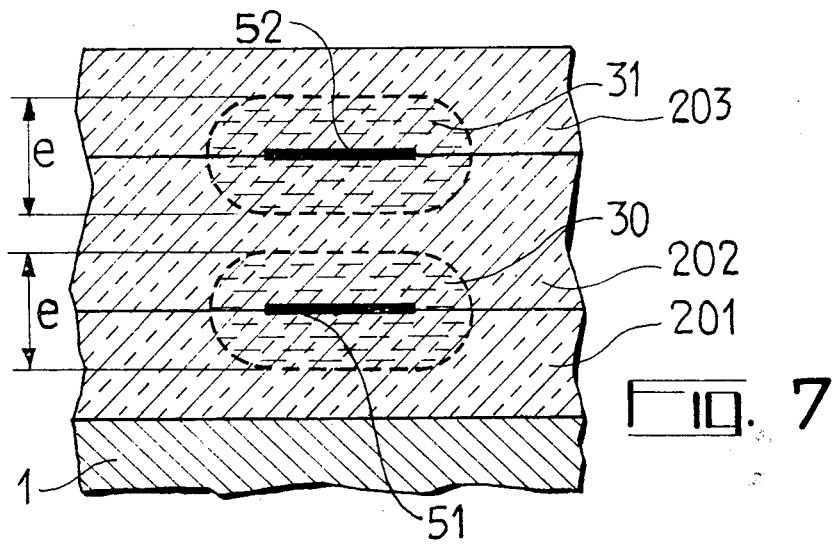
FIG. 7 shows another embodiment of a stepped waveguide structure integrated with directional coupler, in accordance with 'the invention.

FIG. 7 illustrates in section, perpendicular to the axis of a directional coupler, the resultant structure which does not differ from those described in FIGS. 3 and 4 except in terms of the shape of the lateral walls of the waveguide.

On the flat substrate 1, there are successively deposited :
  a first layer 201 which is uniform and thick, of the basic material ;
  a layer 51 of doping material having a thickness of some few tenths of angstrom units only and reproducing, thanks to the use of a mask, the pattern of the waveguide network which is to form the first stage of the structure ;
  a second, uniform layer 202, of basic material ;
  a layer 52 of the same thickness as the layer 51, of the doping material and reproducing, thanks to the use of another mask, the pattern of the waveguide network which is to form the second network of the structure ;
  a third, uniform layer 203 of basic material.

Thus, as many sandwiches are superimposed as there are stages in the structure. The layers 51 and 52 are too thin to appreciably disturb the relief of the upper layers. The system is then heated to a sufficient temperature to cause the doping material to diffuse into the base material. The thin films 51, 52 thus, by diffusing into the base material, form the zones 30, 31 ... of higher refractive index, which constitute the stepped waveguide networks. The rate of diffusion of the doping material into the base material at the temperature in question being known , the time of the diffusion operation can be controlled to give the waveguides the desired thicknesses ; the doping concentration and, consequently, the variation in refractive index, will be determined by the thickness of the layers of doping material.

One characteristic of the waveguides obtained by the method (and its improved version hereinbefore described) resides in the fact that because of the diffusion method utilised to inser the network of waveguides into the surrounding medium, there is not sudden transition but instead always a continuous transition between the high refractive index of the waveguide and the low refractive index of the surrounding medium. The refractive index gradient within the body of the waveguide in no way affects the propagation of the radiation ; however, it imposes more complex geometric dispositions and more substantial concentrations of doping material, than those which can be obtained by creating, according to a second improvement of the method of the invention, within the body of the base material uniform zones of different refractive indices in a manner which is possible, by an appropriate choice of the basic material and the doping material.

This improvement will be described hereinafter.

This improvement in accordance with the invention, consists in utilising as basic material, a mixture of several chemical elements in proportions close to the stoichiometric ratio corresponding to a predetermined compound, and in locally diffusing there a doping material which enables the basic material to reach this stoichiometric composition. More precisely, if the compound has the chemical formula $A_M B_M \ldots I_P J_Q$ (where A, B, ... I, J are elements of the periodic system and L, M, ... P, Q are whole numbers) then for example a layer of the basic compound $A_L B_M \ldots I_{P(1-x)} J_{Q(1-x)}$ (where $x$ is small compared with unity) will be deposited, and into this there will be diffused as doping material, either a mixture of the elements I and J or a compound $I_P J_Q$.

In a general fasion, it will be observed then that as diffusion takes place the base material is enhanced in doping material, although never exceeding the limiting proportion corresponding to the compound defined. Thus, in the body of the basic material, they are obtained regions uniformly possessing the refractive index of the compound and delimited by narrow zones in which the index varies continuously from the value corresponding to the stoichiometric composition to that of the non-stoichiometric composition of the basic material.

Various methods can be utilised to deposit the basic material. It is possible either to simultaneously deposit, from different sources, the various elements involved, the rate of deposition of each of them, being appropriately controlled, or, of the compound in question decomposes on evaporating, to control the differences in vapour pressure or condensation rate of the various elements, or again, if one of the component elements is a gas or a vapour, to deposit the other components under a suitable gas or vapour pressure of this component.

In the same way, to effect diffusion of the doping material, depending upon the nature of the latter, it can be deposited previously on the surface of the basic material, if it does not evaporate at the diffusion temperature, the overall structure then being heated subsequently, or, if it is in the form of a gas or vapour, it can be diffused in the hot state, at the partial pressure of said gas or vapour. The transformation, in thickness, of the non-stoichiometric mixture into a stoichiometric compound, can likewise be produced by chemical or electrochemical processing in the liquid phase.

It will be shown that a not negligible advantage of said second improvement according to the invention, resides in the facility which it renders possible, where the basic material is of the high refractive index, to re-adjust the superimposition of two rectilinear waveguide sections forming a directional coupler, if the masking process has not made it possible to position the mask corresponding to the top waveguide, with the desired precision.

Figure 8:
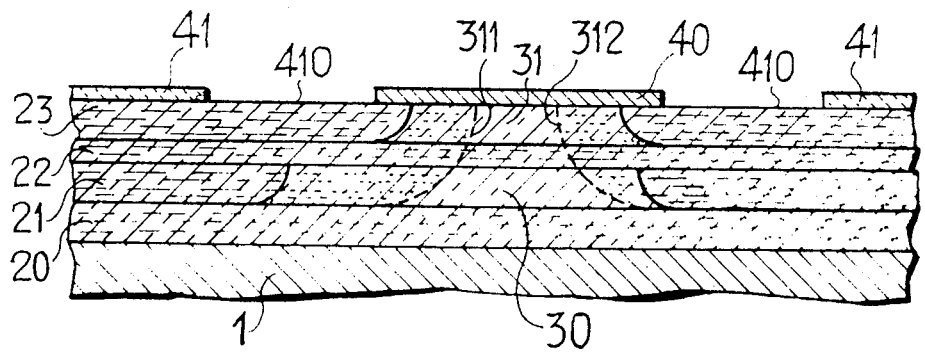
FIGS. 8 and 9 are explanatory diagrams relating to the method according to the invention by which it is possible to adjust the superimposition of directional couplers.
Figure 9:
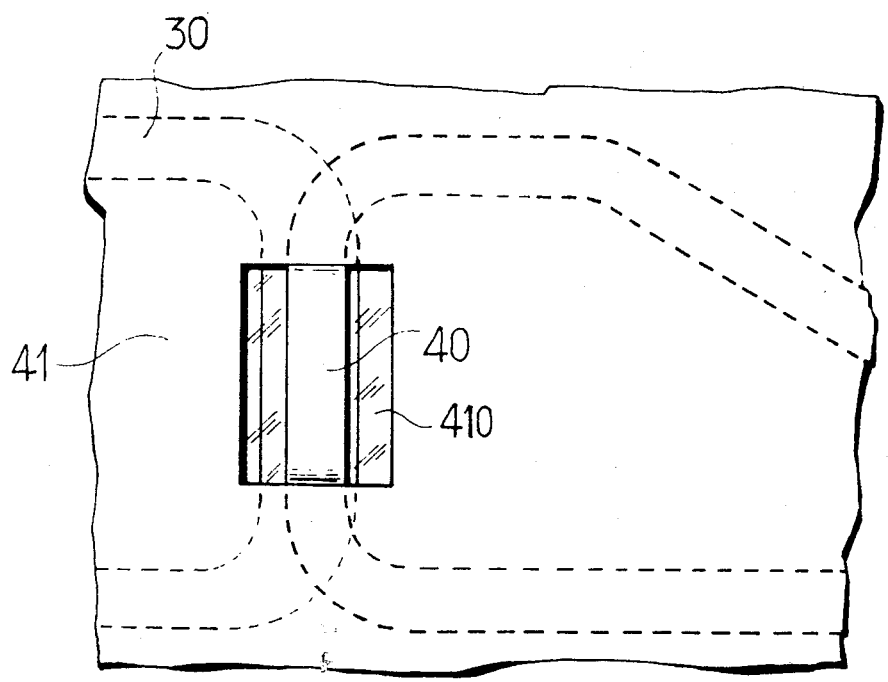

FIGS. 8 and 9 illustrate the process utilised to adjust the superimposition of waveguide portions building up the couplers.

FIG. 8 illustrates a section, perpendicular to the common axis of a coupler, through a stepped structure comprising two waveguide stages. On substrate 1, the first low refractive index layer 20 of the stoichiometric compound, has been deposited ; the second layer 21 is formed by deposition of the basic material a non-stoichiometric high refractive index mixture, which by diffusion of the doping material has been converted into a stoichiometric low refractive index compound, with the exception of the masked areas which form the waveguide 30. Intentionally, the width of this waveguide has been considerably increased into the rectilinear section corresponding to the coupler. The third layer deposited, the layer 22 of low thickness, is a layer of uniform low refractive index. In the fourth low refractive index layer 23, as before, by means of the mask 40, a high refractive index zone is produced to form the top waveguide 31. To adjust the respective positions of the two rectilinear waveguide sections forming the coupler, the first mask 40 is retained and superimposed on it a second mask 41 is produced with covers the whole of the area of the layer 23 with the exception only of the region surrounding the coupler.

FIG. 9 illustrates a plan view of the layer 23 upon which the first mask 40 deposited can be seen as well as the second mask 41 covering the totality of the layer 23 with the exception of the region 410 ; the pattern of the underlying waveguide 30 has likewise been shown in dotted line.

Once the second mask 41 has been deposited, another diffusion of the doping material is carried out. This material penetrates into the portions of region 410 which have been left exposed by the mask 40. The duration of the diffusion operation is such that the doping material penetrates down to the layer 20. The dotted lines 311 and 312 of FIG. 8 indicate the limits of the zones in which the compound, hitherto a non-stoichiometric one of high refractive index, have been transformed into a stoichiometric compound of low refractive index, and delimit the new lateral contours of the two waveguides 30 and 31 which are exactly superimposed upon one another. By way of an example of application, in accordance with the invention, there will now be described in detailed fashion a process for the production of a stepped waveguide structure, in which the base material is tantalum $Ta_2O_{5(1-x)}$, and the doping material oxygen, by diffusion into the base material, enables the latter to attain the stoichiometric composition of the oxide $Ta_2O_5$.

Tantalum oxide, as a material for dielectric waveguides, has advantageous characteristics ; its transparency in the range of visible wavelengths is excellent and remains so even if the oxygen content is reduced to below the stoichiometric level, and, furthermore, it can be deposited in a vitreous form, the absence of crystalline grains being essential to ensure proper propagation of the radiation.

The refractive index of tantalum oxide $Ta_2O_5$ is in the order of 2.2 ; this index increases when the oxygen content drops below the stoichiometric level. Thus, the doping material, oxygen in the present instance, reduces the index of the basic material : the tantalum suboxide.

To obtain the basic material, the tantalum is deposited upon its substrate, silicon for example, by cathode-sputtering under a certain oxygen partial pressure. By controlling the oxygen partial pressure in the vessel, for a given rate of deposition of tantalum, this being tantamount to adjusting in relation to one another the number of metal atoms and reactive gas molecules which strike the substrate per unit time, it is possible in effect to obtain deposits whose compositions vary from tantalum to the stoichiometric oxide $Ta_2O_5$.

If required, the high refractive index regions are protected by an aluminum layer, using conventional masking techniques.

The introduction of the doping material, the oxygen, is effected by heating the base material layer to 500° C in an atmosphere containing oxygen at a partial pressure. The oxygen diffuses into the unprotected zones of the base material to produce an oxide layer $Ta_2O_5$ of low refractive index, whose depth is controlled by controlling the time of the operation. The introduction of the doping oxygen into the base material can also be effected by means of an anodising treatment, this then replacing the heat treatment.

The sequence of operations which, in accordance with the invention, make it possible to produce a two-stage structure, in accordance with the drawing of FIG. 4, is as follows:

1. deposition upon the silicn substrate of a uniform layer of stoichiometric oxide $Ta_2O_5$ of low refractive index, obtained by vaporising tantalum in the presence of a certain oxygen partial pressure ;
2. deposition of a layer of non-stoichiometric oxide $Ta_2O_{5(1-x)}$ of high refractive index, obtained by reducing the oxygen partial pressure in the vessel during the vaporisation of the tantalum ; the thickness of this layer fixes the thickness of the waveguides in the first network ;
3. deposition of an aluminium mask reproducing the patterns of the network of waveguides to be inserted in the underlying layer ; a uniform aluminum layer is deposited and cut away using a photographic technique ;
4. localised oxidation of the non-stoichiometric oxide layer, by heating the system to 500° C at a certain oxygen partial pressure ; the oxygen diffuses into the unprotected regions of the layer and transforms them into stoichiometric oxide of low refractive index ; the duration of the diffusion operation is regulated so that the whole thickness of the layer is oxidised ; the regions protected by the mask remain in the non-stoichiometric oxide state with a high refractive index, and form the network of waveguides ;
5. superficial cleaning of the structure produced, in order to remove the mask ;
6. deposition of a new stoichiometric oxide layer of low refractive index and small thickness, the latter being definable to within 10 A units ;
7. deposition of a high refractive index layer (operation similar to operation (2) ;
8. masking this new layer (operation similar to operation (3) ;
9. localised oxidation (operation similar to operation (4) ;
10. possible deposition of a new aluminium mask of the preceding one, leaving exposed only the neighbourhood of the coupling zones (operation similar to operation (3), except as far as the patterns of the mask is concerned) ;
11. localised oxidation ; the duration of the operation is such that the oxidation reaches the top level of the layer deposited during operation (1) ;
12. superficial cleaning of the structure (operation similar to operation (5) ;
13. possible deposition of the uniform low-refractive index layer terminating the structure (operation similar to operation (1) ;

Operations 10 and 11 are only necessary if it is required to readjust the superimposition of the couplers.

In concluding, it will be noted that it is possible to utilise a process identical to this, replacing the tantalum by zirconium, however, the stoichiometric oxide which is obtained then being amorphous zirconium which satisfies the formula $Zr\ O_2$.

We claim:

1. An integrated waveguide structure, made of a plurality of superimposed plane layers of respective constant thicknesses, for super high frequency electromagnetic waves, comprising in combination, in said layers respectively: waveguides capable of transmitting said waves, made of a first substance having a first refractive index, a medium of a second substance having a second refractive index, lower than the first, surrounding said waveguides, said first and said second substance, comprising a basic chemical material, and at least one of them being a solid solution of another chemical material the amount of said other material in said solid solution respectively having different values in said first and said second substances.

2. A structure as claimed in claim 1, wherein said medium is a wafer having two parallel faces, said guides having respectively two walls parallel to said faces.

3. A structure as claimed in claim 2, wherein said basic chemical material is a mixture of several chemical elements in proportion close to the stoichiometric, for a well defined chamical compound, said other chemical material comprising at least one of the chemical elements contained in said basic material, making it possible to obtain said well defined chemical compound.

4. A structure as claimed in claim 3, wherein said well defined chemical compound is amorphous tantalum pentoxide $Ta_2O_5$, said basic chemical material, amorphous tantalum suboxide $Ta_2O_{5(1-x)}$ said other chemical material oxygen.

5. A structure as claimed in claim 3, wherein said well defined chemical compound is amorphous zirconium dioxide $ZrO_2$, said basic material amorphous zirconium suboxide $ZrO_{2(1-y)}$, and said other material oxygen.

6. A method for manufacturing a structure as claimed in claim 1, wherein said other material is locally diffused through masks having predetermined patterns, in said medium, said masks protecting the remaining medium from diffusion, the depth of diffusion determining the thickness of said guides.

7. A method as claimed in claim 6, wherein said diffusion decreases the refraction index of said medium, said guides extending in the regions protected by said masks.

8. A method as claimed in claim 6, comprising in succession and in repetition the following steps:
deposition upon a substrate of an uniform layer of said first substance;
deposition of a mask pattern upon said layer;
diffusion through said mask pattern of said other chemical material, for forming inside said medium said second substance;
removal of said mask pattern.

9. A method for manufacturing the structure as claimed in claim 1, comprising in repetition and in succession the following steps:
deposition upon a substrate by simultaneous condensation, in a predetermined proportions of a plurality of elements capable of forming a well defined chemical compound for forming in a stoichiometric proportion, an uniform layer of said substance upon a substrate;
deposition upon said layer of mask according a predetermined pattern;
deposition by condensation of at least one of said elements in the unmasked portion, for modifying the proportion of said elements, thus forming said second substance;
removing said mask pattern.

* * * * *